March 6, 1956  L. CERINI  2,737,489
DIALYSER DEVICE FOR SODA SOLUTIONS
Filed Nov. 1, 1951
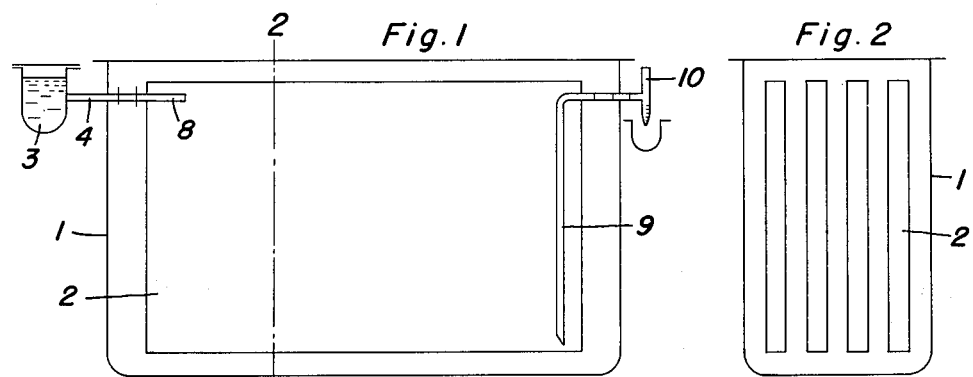
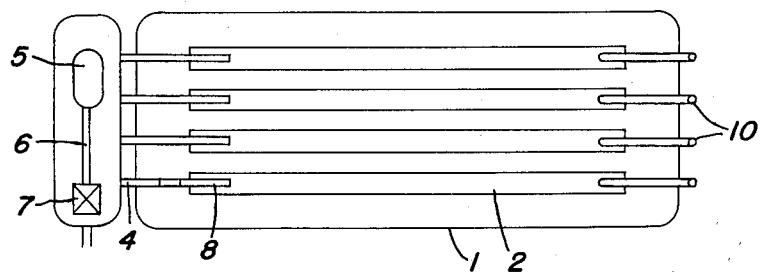
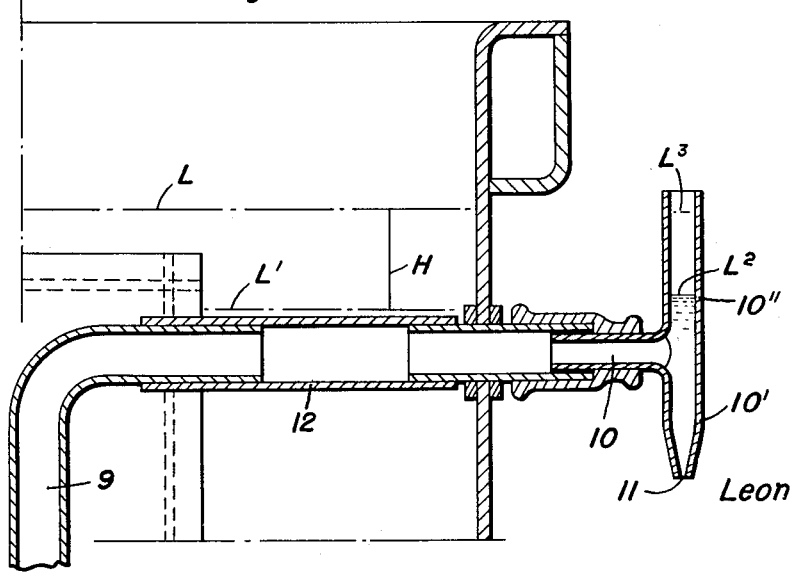
Leonardo Cerini
INVENTOR
BY Stevens, Davis, Miller + Mosher
his ATTORNEYS

United States Patent Office 2,737,489
Patented Mar. 6, 1956

2,737,489
DIALYSER DEVICE FOR SODA SOLUTIONS

Leonardo Cerini, Castellanza, Italy

Application November 1, 1951, Serial No. 254,265

Claims priority, application Italy July 7, 1951

1 Claim. (Cl. 210—8.5)

This invention relates to improvements in a dialyser device for the purification of impure solutions. Dialysing devices for caustic soda solutions, comprise semi-permeable diaphragms in which an osmosis action takes place, said osmosis resulting in a vertical counterflow between the opposed pure solution and the impure solution.

In known apparatus, the dialysing diaphragms, made up of opposing fabric walls secured together to form a flattened bag with the walls kept apart and in upstanding positions by suitable means, are immersed in the impure solution within a vessel and are fed with water which increases in pure soda as it flows from the tops to the bottoms of the diaphragms. At one or both of the ends of the bottoms of the diaphragms outlet pipes for the thicker solution are provided and are connected by resilient fittings to other pipes which pass through the heads of the container they are attached to and which are connected by suitable fittings to a manifold assembly, so that the flow from each diaphragm is fed to a single discharge means. The difficulty with such structure lies chiefly in the fact that the arrangement of pipes does not permit ready and easy removal of one or more diaphragms, during the operation of the device, and does not enable the detection of a malfunctioning diaphragm. In order to replace a worn out or otherwise imperfect diaphragm it is necessary to halt the operation of the device, empty the vessel and then remove the fittings, which task is laborious and time-consuming.

The main object of the present invention is to provide independent diaphragms which can be easily detected as faulty and replaced without shutting down the entire operation of the device, such object being realized by providing a novel pipe outlet means for conducting the purified solution from each diaphragm. Such means extends through the top of each diaphragm, avoiding fittings or connections with the bottom thereof, and such means includes a tube extending upwardly in each diaphragm from a position adjacent the bottom thereof and being horizontally extended adjacent the top of each diaphragm and below the surface of the purified solution to pass in a horizontal plane through the vessel and terminate in a novel nozzle arrangement.

A further object of this invention is to provide a novel nozzle arrangement for the horizontally disposed outlet end of each tube, such nozzle arrangement including an L-shaped transparent nozzle having a horizontal leg connected to the tube and a vertical leg depending therefrom and terminating in a calibrated port and including a vertical leg extending from the junction of the L-legs and being open to the atmosphere and being formed to serve as a dependable detection means for the proper operation of its associated diaphragm.

The foregoing and ancillary objects are attained by this invention, the preferred form of which is set forth in the following description and illustrated in the accompanying drawing, wherein;

Figure 1 is a longitudinal vertical sectional view of the device, showing in detail one of the diaphragms and its associated outlet means, the latter being shown in elevation;

Figure 2 is a cross-sectional view taken on line 2—2 of Figure 1;

Figure 3 is a top plan view of the device; and

Figure 4 is an enlarged detailed sectional view of the outlet means and nozzle arrangement.

Referring now more particularly to the accompanying drawing, the device includes a vessel 1 in which a plurality of independent diaphragms 2 are vertically disposed. Each diaphragm is formed to provide an enclosed cell to contain the purified solution and includes flattened bags, each of which is provided with metal cages to keep them upright and with inner metal nets to keep the walls of the diaphragm spread apart.

Water is fed into the diaphragms from a tank 3 which is mounted alongside the upper end of the vessel and is provided with outlet pipes 4, a pipe being provided for each diaphragm. The tank 3 has a single inlet pipe (Figure 3) which is controlled by the valve 7. The valve 7 is actuated by the ball float 5, which is adjustably carried by the connecting arm 6. The pipes 4 are suitably connected by means of fittings with axially aligned feed tubes 8, which are fitted near the top end of each diaphragm.

The separation of the pure solution is carried out by a flow tube 9, provided for each diaphragm and extending vertically or substantially vertically from the lower end of each diaphragm. Thus, the bottom portion of each flow tube 9 extends downwardly through the purified solution in each diaphragm to substantially the bottom of the diaphragm. The flow tubes 9 have horizontally extended upper portions which are disposed horizontally below the upper ends of the diaphragms and are positioned horizontally immediately below the surface of the purified solution. By means of suitable sleeve fittings 12 the upper portions are connected to discharge nozzles 10, which are shown in Figures 1 and 4 and which are disposed exteriorly of the vessel 1.

In Figure 4, the line L represents the water level in the feeding tank 3 and the line $L^1$ represents the level of the pure solution passing out through the nozzles 10. Line H indicates the level difference between the water and the pure solution. The operation of the dialyser depends on the concurrence and synchronized working of two factors, namely:

(a) A controlled steadiness of the water level L against the level $L^1$ of the pure solution flowing from each diaphragm, and, (b) A discharge of the pure solution retained steady by a calibrated flow and in depression.

The result of the coaction of such components, one of which is fixed and the other of which is changeable, is a thorough balancing of the device and ensures an effective operation within an extreme range of workings and concentrations.

For example, the mean density of the pure solution inside a diaphragm, based on the extreme values of 1.000 as to the upper level (water) and 1.090 for the lower level (pure soda solution to be removed) runs as high as 1.045. This means that a hydrostatic balancing between both columns concerned, assuming the height of the diaphragm to be 1000 mm., will be achieved when the liquid column filling the insides of the diaphragms will be of 45 mm. in excess of the liquid columns inside the tube 9. A slight excess above such a level will be enough for altering the balance and for bringing about the discharge of the pure solution from the upper end of the tube 9 as a result of a simple skimming. However, two factors may effect such a flow with free spilling; one, the possibility that among so great a number of working parallel diaphragms some concentration differences will arise which would cause, the common head of the water on the diaphragms being equal, flow differences considerably inversely proportional to the concentrations, thus, resulting in the discharge of thinner solutions, and, two, the difficulty of making the liquids flow regularly and steadily, should there exist long travel paths and considerable loads losses in the presence of limited head differences.

Such factors are obviated by the discharge nozzle 10 which is connected by the sleeve fittings 12 to the upper horizontal end of each flow tube 9. The discharge nozzle is angular or L shaped and has a horizontal leg connected to the fittings 12 and a vertical leg 10' extending downwardly therefrom. The nozzle is transparent and is formed from glass or plastic. The vertical leg has its lower or outlet end tapered and terminating in a calibrated port 11, based on the efficiencies of a standard diaphragm, that is, for a capacity of roughly 40 cc. a minute. In such an instance, the port size will be between 10 and 12 tenths of mm.

The vertical leg 10' is formed of a length suitable for establishing a certain depression which acts as a prime for the outlet of liquid and keeps the flow steady. The upright part of hte vertical leg 10' is connected in axial alignment and communication with an upstanding tubular leg 10'' which is open to the atmosphere at its upper end. Inside the leg 10'' a level $L^2$ is marked, which level $L^2$ is somewhat higher than $L^1$. In such leg 10'', there is also provided the means for indicating when a diaphragm is worn out and needs to be replaced.

When a diaphragm is worn out, as by corrosion or breakage of one of the walls thereof, the flowing solution (which is visible at $L^2$ just above the juncture of the legs of the nozzle 10) will rise at once to the upper level $L^3$ which corresponds to that of the impure solution (kept nearly to the water level L) and will clearly show the color imparted by the impure solution. To replace the worn out diaphragm it can be seen that it is only necessary to remove the fittings connecting the tube 8 to the tube 4 and connecting the flow tube 9 to the nozzle. The diaphragm may then be removed and replaced, the entire operation being easily carried out without effecting the operation of the device, with the other diaphragms.

What I claim is:

A dialyser device for the purification of impure solutions comprising a vessel for containing the impure solution, a plurality of dialysing diaphragms supported within said vessel, each of said diaphragms formed to provide an enclosed cell to contain the purified solution, a means to feed water to each of said cells at one end thereof, means to conduct said purified solution from each of said cells, said last named means comprising a flow tube located at the opposite end of each cell to said water-feeding means and the bottom portion of said tube extending downwardly through said purified solution to substantially the bottom of said cell, the upper portion of said tube extending horizontally immediately below the surface of said purified solution adjacent the top of the cell and protruding through said cell to terminate exterior to said vessel, an L-shaped nozzle, one leg being connected to the exterior end of said tube and the other leg extending downwardly from said tube and terminating in a calibrated port, said nozzle being transparent and further including a vertical leg extending upwardly from the junction of said L-legs, the upper end of said vertical leg being open to the atmosphere.

References Cited in the file of this patent

UNITED STATES PATENTS

| | | |
|---|---|---|
| 558,970 | Lugo et al. | Apr. 28, 1896 |
| 1,719,754 | Cerini | July 2, 1929 |
| 2,061,505 | Collins | Nov. 17, 1936 |
| 2,277,091 | Feyens | Mar. 24, 1942 |
| 2,405,456 | Signer | Aug. 6, 1946 |

FOREIGN PATENTS

| | | |
|---|---|---|
| 232,595 | Sweden | Sept. 1, 1944 |
| 575,633 | France | Apr. 25, 1924 |